United States Patent
Ahn

(10) Patent No.: US 6,447,029 B1
(45) Date of Patent: Sep. 10, 2002

(54) CONNECTION APPARATUS FOR WATERWAY PIPE

(76) Inventor: Jung Ki Ahn, 60 Yupnaeri, Yooljin-yup, Yooljin-gun, Kyungsangbuk-do (KR)

(*) Notice: Subject to any disclaimer, the term of this patent is extended or adjusted under 35 U.S.C. 154(b) by 15 days.

(21) Appl. No.: 09/630,167

(22) Filed: Aug. 1, 2000

(30) Foreign Application Priority Data

Sep. 7, 1999 (KR) .......................................... 99-37973

(51) Int. Cl.[7] ................................................. F16L 21/00
(52) U.S. Cl. ........................ 285/419; 285/410; 285/417
(58) Field of Search ................................ 411/120, 119; 24/279, 20 R; 285/417, 419, 373, 367, 366, 410

(56) References Cited

U.S. PATENT DOCUMENTS

| | | | |
|---|---|---|---|
| 4,734,001 A | * 3/1988 | Bennett ...................... | 411/119 |
| 4,790,574 A | * 12/1988 | Wagner et al. .............. | 285/419 |
| 4,906,150 A | * 3/1990 | Bennett ....................... | 411/119 |
| 5,010,626 A | * 4/1991 | Dominguez .................. | 24/279 |
| 5,961,161 A | * 10/1999 | Sponer ........................ | 285/373 |

\* cited by examiner

*Primary Examiner*—Lynne H. Browne
*Assistant Examiner*—Aaron M Dunwoody
(74) *Attorney, Agent, or Firm*—Ladas & Parry

(57) ABSTRACT

A connection apparatus for a waterway pipe is disclosed, which includes a plurality of pipes each having both ends which are connected in series, a coupler having protruded both ends and a connection member having a plurality of connection grooves for surrounding the connection portions of the pipes, an engaging member which passes through the connection groove, and an engaging member having one end inserted into the connection groove and the other end contacting with one side of the connection member, so that the coupling member moves backwardly and forward by a rotation force of the engaging member, and the coupler is tightened and loosened.

3 Claims, 6 Drawing Sheets

CONNECTION APPARATUS FOR WATERWAY PIPE

BACKGROUND OF THE INVENTION

1. Field of the Invention

The present invention relates to a connection apparatus for a waterway pipe, and in particular to a connection apparatus which is capable of fabricating a long pipe by connecting a plurality of pipes each having a certain length.

2. Description of the Background Art

Generally, a waterway is used for continuously providing water from a river, a water reservoir, etc. to a rice field.

The waterway is formed by digging a certain area using a channel shape concrete.

Therefore, it takes a long time for forming the waterway, and the cost for forming the waterway is increased. In addition, the waterway is formed on the ground, and the nature and the environment are damaged.

In order to overcome the above-described problems, as shown in FIGS. 1 and 2, a plurality of metal pipes are used for forming a waterway. Recently, a pipe 100 of FIG. 1 is generally used.

Namely, the pipes 100 each having a certain length are connected using a coupler 200. The coupler 200 surrounds each end of the pipes 100, and then the both ends of the coupler 200 are connected using a bolt 300 and a nut 400.

When connecting both ends of the coupler 200, in a state that one of the bolt 300 and the nut 400 is fixed, the other one of the bolt 300 and the nut 400 is rotated. Therefore, it is difficult to maintain a fixed state of the same, and in addition, another person is required for maintaining the fixed state.

SUMMARY OF THE INVENTION

Accordingly, it is an object of the present invention to provide a connection apparatus for a waterway pipe which overcomes the problems encountered during a conventional coupler connection work.

It is another object of the present invention to provide a connection apparatus for a waterway pipe which is capable of automatically fixing one of a bolt and a nut which are used for connecting the both ends of a coupler, so that it is possible to easily rotate the other one of the bolt and the nut. Therefore, a person is not additionally used for fixing one of the bolt and the nut.

In order to achieve the above objects, there is provided a connection apparatus for a waterway pipe which includes a plurality of pipes each having both ends which are connected in series, a coupler having protruded ends and a connection member having a plurality of connection holes, the connection member surrounding the connection ends of the pipes, an engaging member which passes through the connection holes, the engaging member having one end inserted into a connection hole and the other end contacting one side of the connection member, so that the coupling member moves backwardly and forward by a rotation force of the engaging member and the coupler is tightened an loosened.

The connection hole formed at the connection member is polygonal.

The engaging member includes a support member contacting with one side of the connection member, an engaging hole formed at a center portion of the support member and threadably engaged with the support member, and a rotation prevention member integrally formed with one side of the support member and having an outer surface corresponding to an inner surface of the polygonal hole.

The rotation prevention member includes a vertical cut-away groove formed at both sides of the center portion of the same, and a fixing member inserted into the cut-away groove.

Additional advantages, objects and features of the invention will become more apparent from the description which follows.

BRIEF DESCRIPTION OF THE DRAWINGS

The present invention will become more fully understood from the detailed description given herein below and the accompanying drawings which are given by way of illustration only, and thus are not imitative of the present invention, and wherein.

DETAILED DESCRIPTION OF THE PREFERRED EMBODIMENTS

The embodiments of the present invention will be explained with reference to the accompanying drawings.

Figure 1:
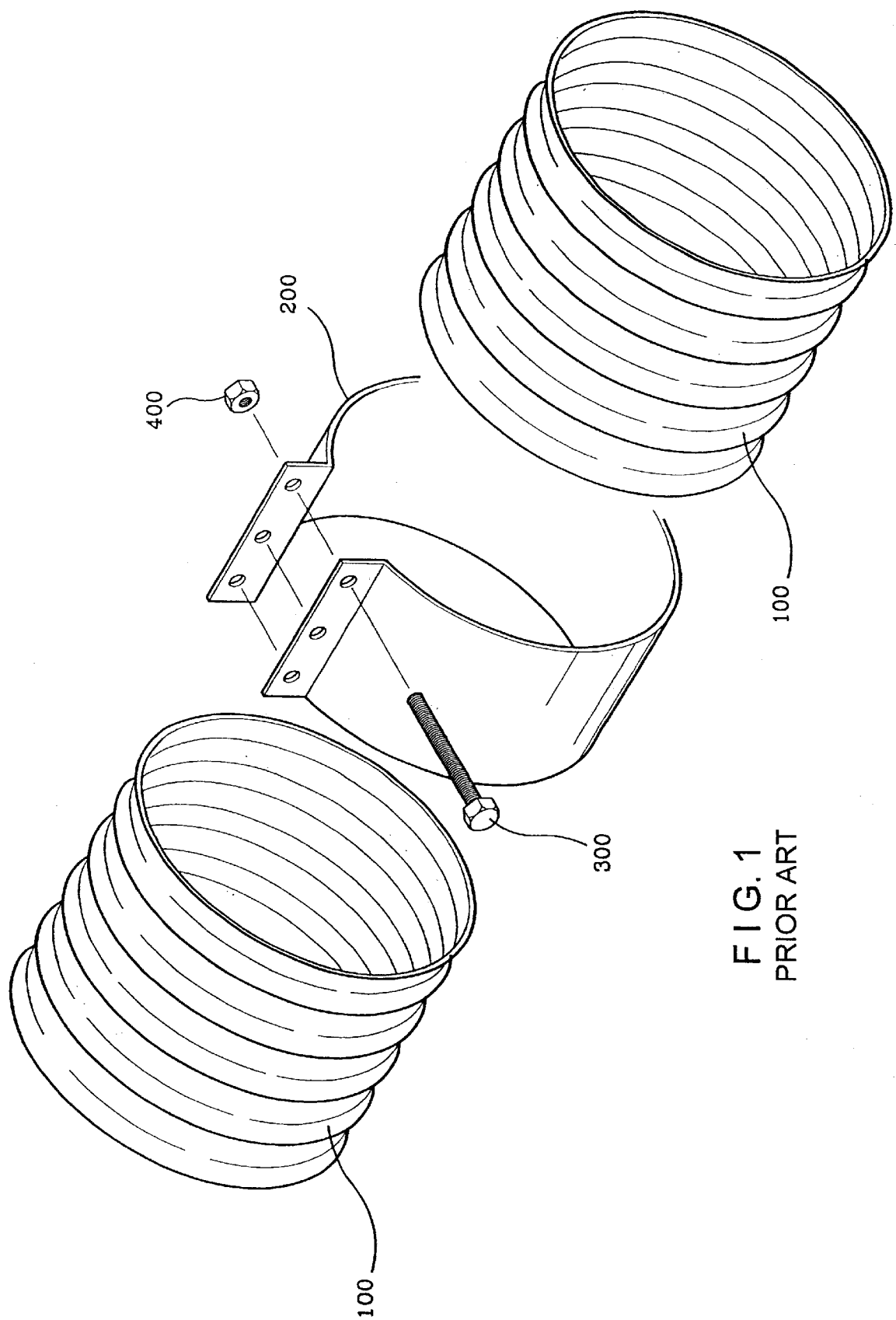
FIG. 1 is an exploded perspective view illustrating a state for connecting a conventional waterway pipe and connection portions using a coupler.
Figure 2:
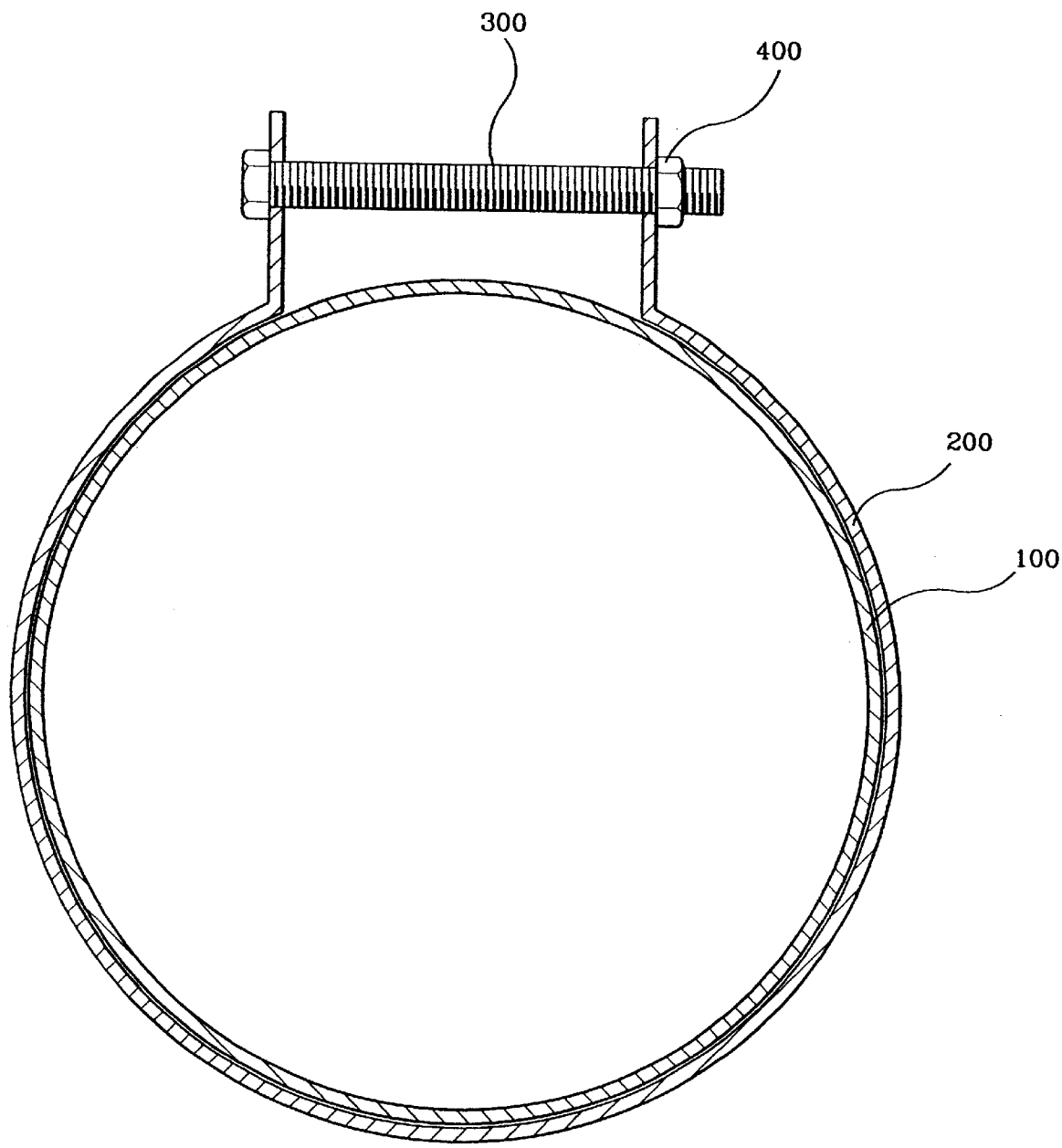
FIG. 2 is a cross-sectional view illustrating a connection state of a conventional waterway pipe.
Figure 3:
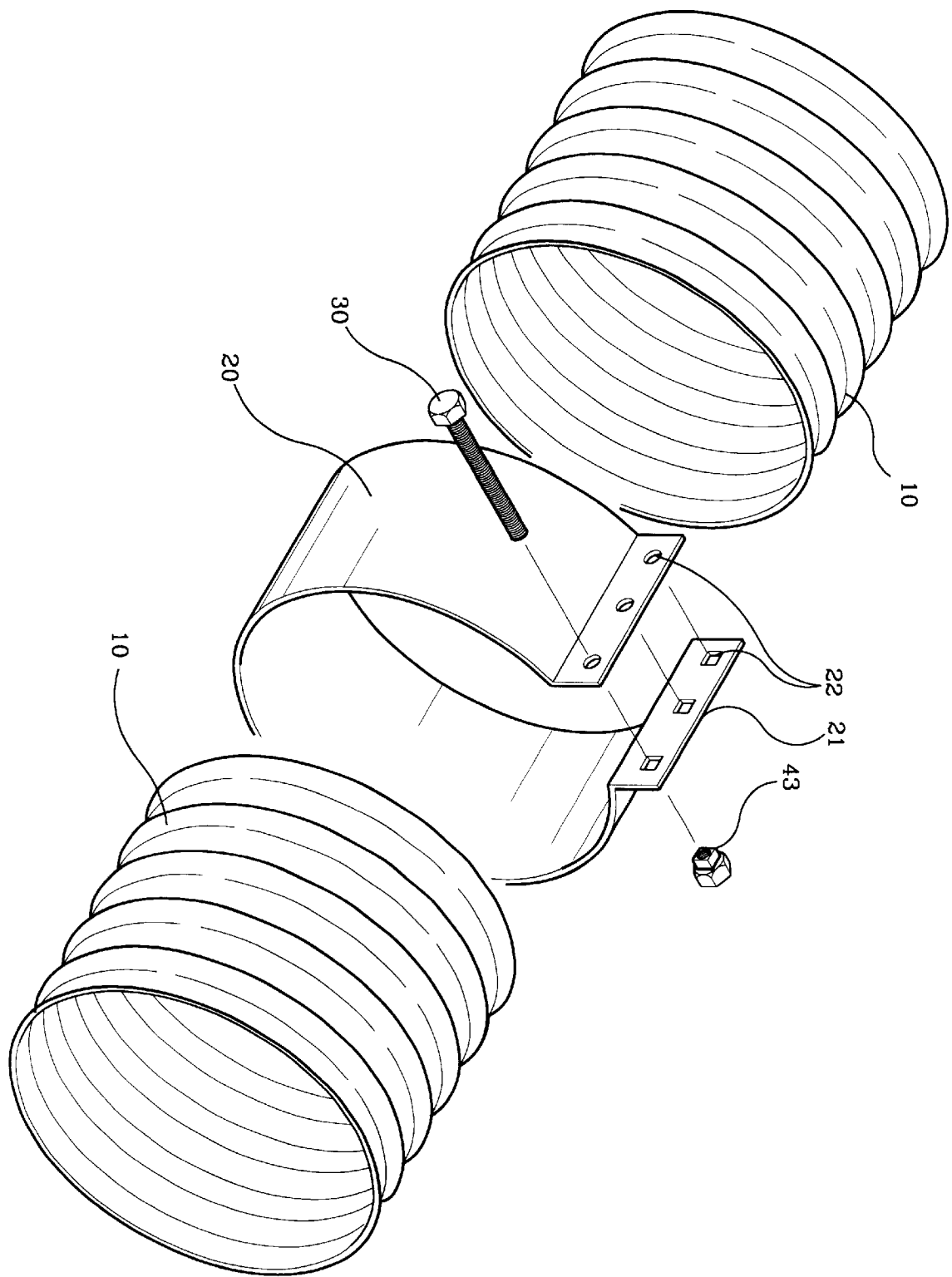
FIG. 3 is an exploded perspective view illustrating a state for connecting a waterway pipe and connection portions of the same using a coupler according to a first embodiment of the present invention.
Figure 5:
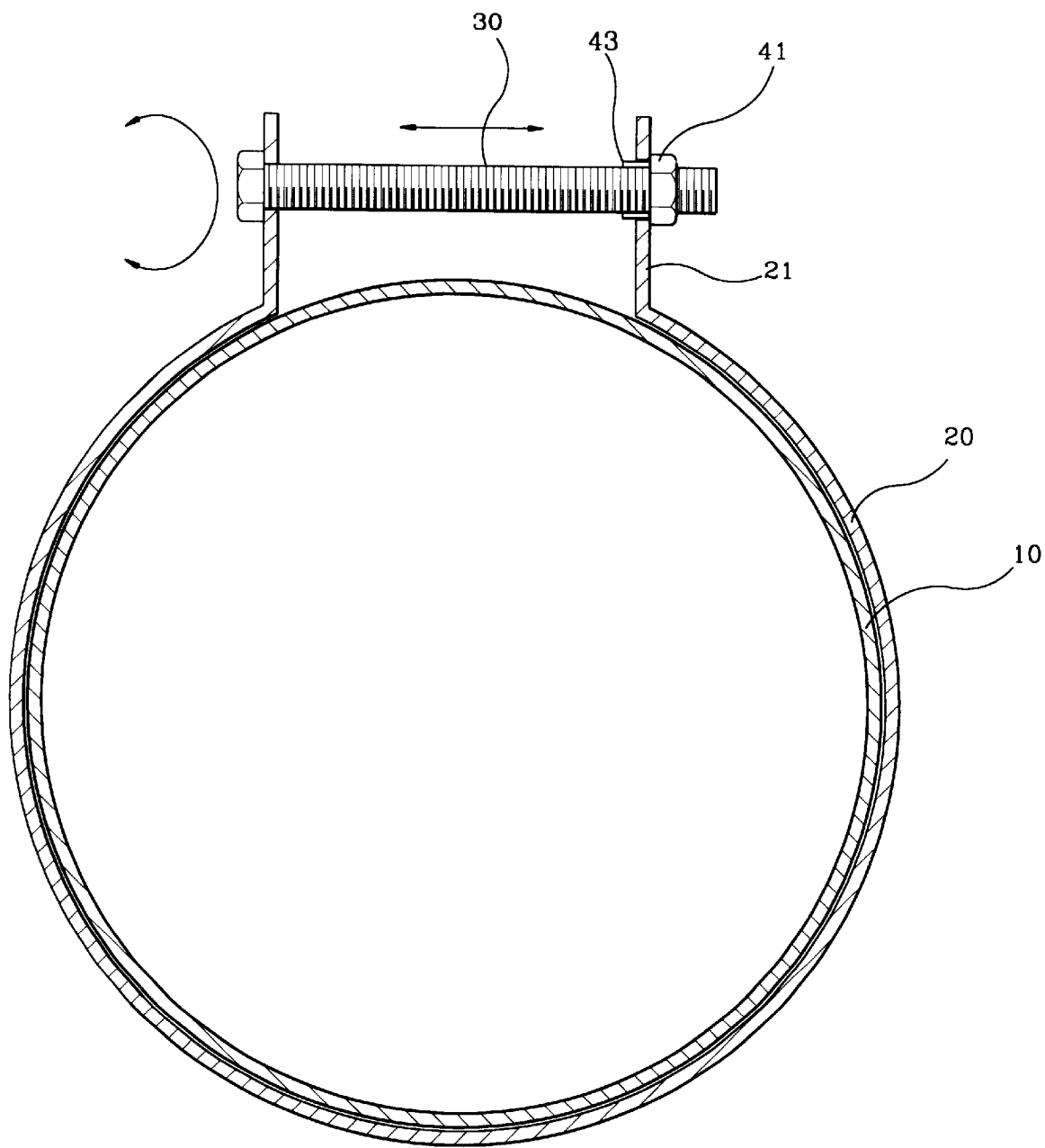
FIG. 5 is a cross-sectional view illustrating a connection state of a first embodiment of the present invention.

As shown in FIGS. 3 and 5, a connection apparatus for a waterway pipe includes a coupler 20 which surrounds the connection portions of a pipe 10 which is connected.

The coupler 20 includes a connection member 21 formed by protruding ends of coupler 20, and a plurality of connection holes 22 formed in the connection member 21. The construction of the coupler 20 is similar to the construction of the conventional coupler 200.

An engaging member 30 (or bolt) passes through the connection hole 22 formed in the coupler 20. The engaging member 30 is fixed by a coupling member 40 (or nut).

One end of the coupling member 40 is inserted in the connection groove 22, and the other end contacts one side of the connection member 21, so that the coupling member 40 moves forwardly and backwardly by the rotation force when rotating the engaging member 30. Therefore, the coupler 20 Is tightened and loosened thereby.

As shown in FIGS. 3 and 5, the connection hole 22 of one protruding end of the connection member 21 is polygonally formed. The coupling member 40 includes a support member 41 supported b one side of the connection member 21 and having an engaging hole at its center portion for threadably engaging with the engaging member 30, and a rotation prevention member 43 having an outer surface corresponding to an inner surface of the connection hole 22 and preventing a rotation by its polytonal structure.

Figure 4:
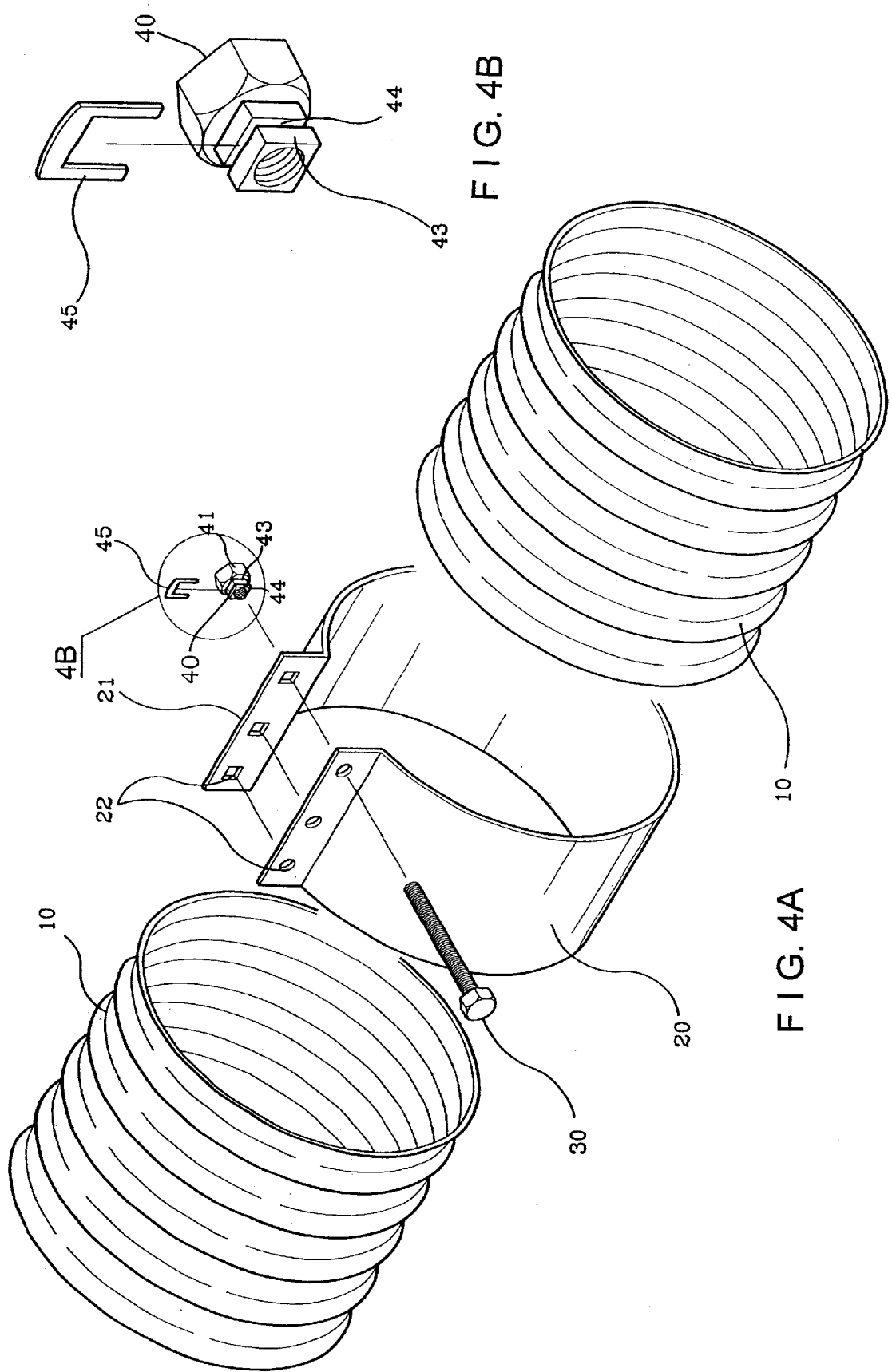
FIG. 4A is an exploded perspective view illustrating a state for connecting a waterway pipe and connection portions of the same using a coupler according to a second embodiment of the present invention.
FIG. 4B is an enlarged exploded perspective view of the coupler of FIG. 4A.
Figure 6:
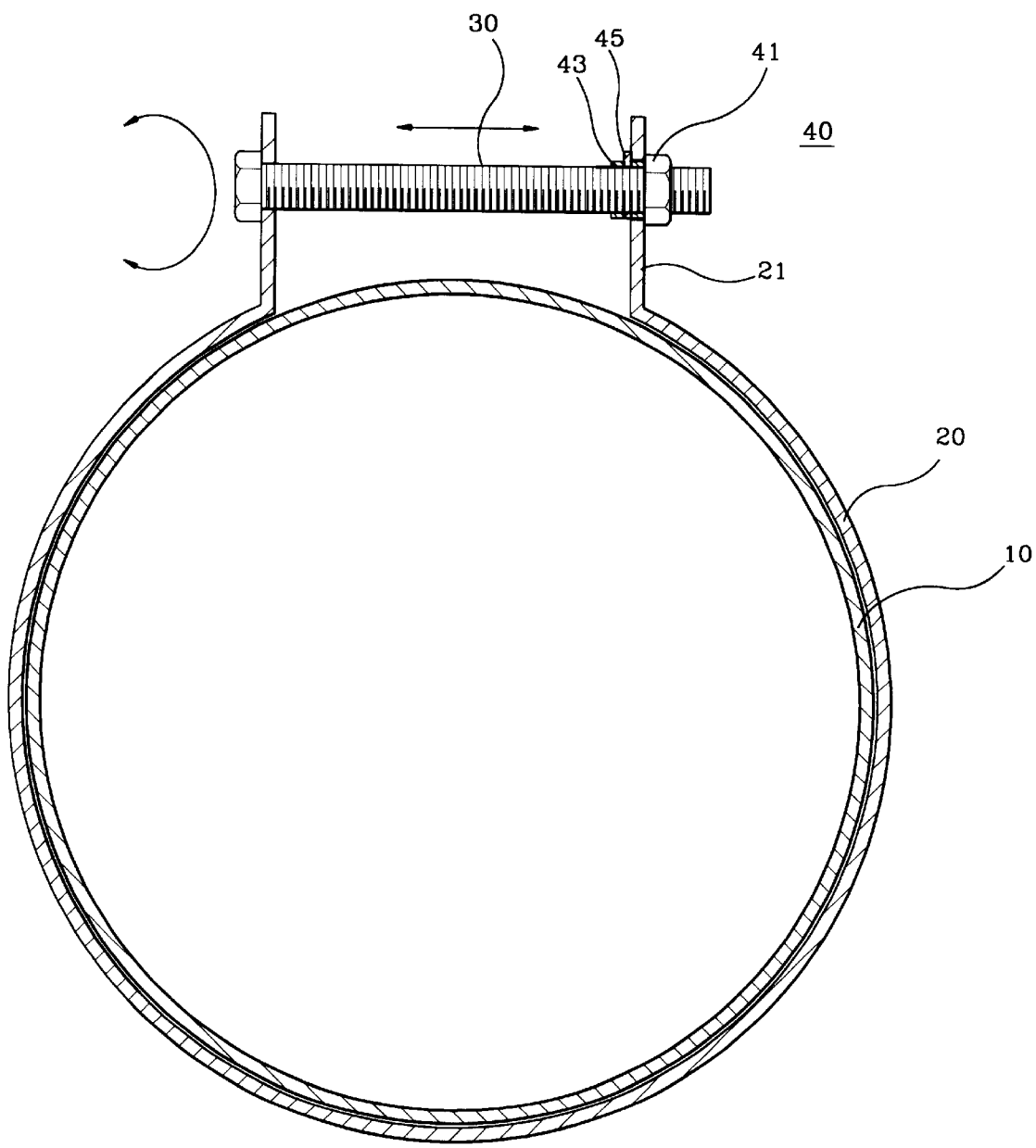
FIG. 6 is a cross-sectional view illustrating a connection state of a second embodiment of the present invention.

As shown in FIGS. 4 and 6, the rotation prevention member 43 includes a vertical cut-way grove 44 at both sides of the center portion, and a fixing member 45 of U-shape with less inserted into the cut-away groove 44.

The operation of the present invention will be explained.

As shown in FIGS. 5 and 6, each pipe 10 is arranged in series, and then the coupler 20 surrounds the connection portions of the pipe.

When the installation preparation of the coupler 20 is completed, the engaging member 30 passes through the connection hole 22 formed at one side of the connection member, and the engaging member 30 protrudes from the outer side of the polygonal connection hole 22 formed in the other side of connection member 21.

When the installation of the engaging member 30 is completed, the coupling member 40 which has the same function as the nut is installed to correspond with the engaging member 30 protruding at the other side of the connection member 21.

Namely, when the coupling member 40 is installed to correspond with engaging member 30, the support member 41 formed at one end of the coupling member 40 contacts with the outer surface of the connection member 21, and the rotation prevention member 43 provided at one side is inserted into the polygonal connection hole 22 formed in the connection member 21 at the other side.

When the installation preparation of the connection apparatus for a waterway pipe according to the present invention is completed, as shown in FIGS. 5 and 6, one end of the engaging member 30 is rotated using a spanner, and the rotation prevention member 43 of the coupling member 40 inserted in the polygonal connection groove 22 moves backwardly and forwardly because it is prevented from rotating.

When the installation preparation of the connection apparatus for a waterway pipe according to the present invention is completed, as shown in FIGS. 5 and 6, one end of the engaging member 30 is rotated using a spanner, and the rotation prevention member 43 of the coupling member 40 inserted in the polygonal connection groove 22 moves backwardly and forward by based on the prevented rotation.

Therefore, it is possible to easily install the coupler 20 for the connection of the pipes 10.

In the conventional art, the waterway pipes are continuously connected using the coupler in a state that one of the bolt and the nut is fixed, and then the coupler is installed. The work process is complicated, and the work time is extended, and more workers are used. However, in the present invention, one of the bolt and the nut which is an engaging member is automatically fixed when engaging [the] both ends of the coupler, so that the other one of the bolt and the hut is easily rotated, and the workers for fixing the engaging member are not needed.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A connection apparatus for pipes comprising:

a coupler extending around longitudinally opposed ends of the pipes, the coupler having opposed connection members at opposite ends thereof;

at least one opposed pair of connection holes in the connection members, at least one of the connection holes being polygonal;

an engaging member projecting through the pair of connection holes;

a coupling member threadably engaging an end portion of the engaging member extending in the polygonal one of the connection holes, said coupling member having an outer polygonal surface engaged in and corresponding in shape to said one of the polygonal holes so that when the engaging member is rotated the coupling member is blocked in rotations said coupling member having a pair of generally parallel grooves on opposite sides thereof; and a U-shaped fixing members having opposite legs engaged in said grooves for retaining said coupling member at the connection member with the polygonal shaped hole.

2. The connection apparatus of claim 1, wherein said engaging member comprises a bolt and said coupling member comprises a nut.

3. The connection apparatus of claim 2, wherein said fixing member is adjacent to the connection member having said polygonal hole at a side of the connection member facing the other of the connection members.

* * * * *